(12) United States Patent
Getschel et al.

(10) Patent No.: US 7,160,095 B2
(45) Date of Patent: *Jan. 9, 2007

(54) APPARATUS FOR OXYGEN ENRICHED FLAME-PERFORATION OF A POLYMER FILM

(75) Inventors: Joel A. Getschel, Osceola, WI (US); Mark A. Strobel, Maplewood, MN (US); Michael J. Ulsh, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 313 days.

This patent is subject to a terminal disclaimer.

(21) Appl. No.: 10/679,633

(22) Filed: Oct. 6, 2003

(65) Prior Publication Data

US 2005/0073070 A1 Apr. 7, 2005

(51) Int. Cl.
 *B26F 1/26* (2006.01)
(52) U.S. Cl. .................. 425/290; 425/363; 425/384; 425/471; 425/DIG. 37
(58) Field of Classification Search .......... 425/290, 425/363, 384, 471, DIG. 37; 264/80, DIG. 70
See application file for complete search history.

(56) References Cited

U.S. PATENT DOCUMENTS

| | | |
|---|---|---|
| 3,012,918 A | 12/1961 | Schaar |
| 3,153,683 A | 10/1964 | Bryan et al. |
| 3,153,684 A | 10/1964 | Bryan et al. |
| 3,255,034 A | 6/1966 | Covington et al. |
| 3,347,697 A | 10/1967 | Gmitro |
| 3,361,607 A | 1/1968 | Bruno |
| 3,375,126 A | 3/1968 | Nagel |
| 3,394,211 A | 7/1968 | MacDuff |
| 3,431,135 A | 3/1969 | Keane et al. |
| 3,783,062 A | 1/1974 | Martin |
| 4,458,608 A | 7/1984 | DeBrucq |
| 4,622,237 A | 11/1986 | Lori |
| 5,891,967 A | 4/1999 | Strobel et al. |
| 6,635,334 B1 | 10/2003 | Jackson et al. |

FOREIGN PATENT DOCUMENTS

AU   525 154 B   10/1982

(Continued)

OTHER PUBLICATIONS

Strobel et al., *Flame Surface Modification of Polypropylene Film*, Journal of Adhesion Science Technology, vol. 10, No. 6, pp. 515-539 (1996).

(Continued)

*Primary Examiner*—Donald Heckenberg

(57) ABSTRACT

The present invention provides an apparatus and methods for flame-perforating polymeric films with an oxygen-enriched flame. One embodiment of the apparatus includes a frame, a support surface attached to the frame, where the support surface includes a plurality of lowered portions, an oxygen-enrichment system for increasing the amount of oxygen in the combustible mixture, a burner attached to the frame opposite the support surface, where the burner supports a stable flame, and a film contacting the support surface, where the flame of the burner is directed towards the film to cause the film to be perforated. One embodiment of the method of flame perforating a polymeric film includes igniting an oxygen-enriched combustible mixture to form a stable flame, wherein the flame generated by the oxygen-enriched combustible mixture provides more uniform perforations.

9 Claims, 4 Drawing Sheets

| | FOREIGN PATENT DOCUMENTS | | |
|---|---|---|---|
| GB | 783664 | * | 9/1957 |
| GB | 851053 | | 10/1960 |
| GB | 854473 | | 11/1960 |
| GB | 1012963 | | 12/1965 |
| GB | 1073605 | | 6/1967 |
| GB | 1 085 949 A | | 10/1967 |
| GB | 1085949 | * | 10/1967 |
| JP | 04-007337 | | 1/1992 |
| JP | 04-059344 | | 2/1992 |

OTHER PUBLICATIONS

U.S. Appl. No. 10/267,538, filed Oct. 9, 2002, An Apparatus For Flame-Perforating Films and Methods of Flame-Perforating Films.

* cited by examiner

APPARATUS FOR OXYGEN ENRICHED FLAME-PERFORATION OF A POLYMER FILM

FIELD

The present invention relates to an apparatus and methods for flame-perforating films.

BACKGROUND

Various methods of making perforated polymer films are known. For example, U.S. Pat. No. 3,012,918 (Schaar), and British Patent Specification Nos. GB 851,053 and GB 854,473 all generally describe processes and apparatuses for improving the heat-sealability of polymeric films by passing the film over a cooled, hollow, rotating, metal cylinder or support roll with a desired perforation pattern while a jet of gas-heated air is directed onto the surface of the film so that specific areas of the film are melted, forming a pattern of perforations.

U.S. Pat. No. 3,394,211 (MacDuff) discusses flame perforation of heat-shrinkable, biaxially oriented polypropylene films. British Patent Specification No. GB 1,012,963 and GB 1,073,605 disclose methods and apparatuses for flame perforating suitable thermoplastic films capable of being softened and melted by heat.

Oxygen-enriched flames have been used to improve the wettability or adhesion properties of polymer films. Such uses are disclosed in patent literature that includes U.S. Pat. Nos. 3,153,683; 3,255,034; 3,347,697; 3,361,607; 3,375,126; 3,431,135; 3,783,062; and 4,622,237 and 5,891,967. These patents describe the use of oxygen-enriched flames for the surface modification of polymers.

SUMMARY

One aspect of the present invention provides an apparatus for perforating a film with an oxygen-enriched flame. The apparatus for flame-perforating comprises: a frame; a support surface attached to the frame, where the support surface includes a plurality of lowered portions; a burner attached to the frame opposite the support surface, where the burner supports a flame; a burner pipe connected to the burner; an oxygen-enrichment system connected to the burner pipe, supplying an oxygen-enriched combustible mixture to the burner pipe; and a film contacting the support surface, wherein the flame of the burner is directed towards the film. In one embodiment of this apparatus a mixer, connected to the burner pipe, facilitates the mixing of appropriate volumes of oxygen, air and a gaseous hydrocarbon fuel to form the oxygen-enriched combustible mixture. In another embodiment of the above apparatus, the apparatus further includes a backing roll attached to the frame, where the backing roll includes the support surface, and where the film is wrapped around at least a portion of the support surface of the backing roll. In one aspect of this embodiment, the apparatus further includes a preheat roll attached to the frame adjacent the support surface, wherein the preheat roll includes an outer surface, and wherein the outer surface of the preheat roll is heated for pre-heating the film prior to the burner. In yet another aspect of this embodiment, the outer surface of the preheat roll is heated greater than 74° C. (165° F.) for pre-heating the film prior to the burner. In yet another embodiment, the preheat roll is a nip roll attached to the frame adjacent the backing roll, wherein the film is between the nip roll and the backing roll. In yet another aspect of this embodiment, the burner is positioned such that the angle measured between the burner and the nip roll is less than 45°, wherein a vertex of the angle is positioned at an axis of the backing roll.

In yet another embodiment, the apparatus further includes a temperature-controlled shield attached to the frame adjacent the backing roll, wherein the temperature-controlled shield is positioned between the burner and the nip roll.

In another embodiment, the apparatus further includes an applicator attached to the frame adjacent the support surface for applying either air or a liquid onto the support surface.

Another aspect of the present invention provides a method of flame-perforating film with an oxygen-enriched flame. The method comprises the steps of: providing a film having a first side and a second side opposite the first side; contacting the second side of the film with a support surface having a plurality of lowered portions; contacting the first side of the film with a heated surface, removing the heated surface from the first side of the film; enriching a combustible mixture with oxygen; igniting the combustible mixture to form a stable flame supported by a burner and fueled by the oxygen-enriched combustible mixture, and thereafter heating the first side of the film with the flame from the burner to perforate the film. In one aspect of the above method, the perforating step perforates the film with a pattern corresponding to the plurality of lowered portions of the support surface.

In one embodiment of the above method, the enriching step further comprises enriching an oxidizer with oxygen and combining the oxygen-enriched oxidizer with a gaseous hydrocarbon fuel to provide a combustible mixture. In another aspect of the above method, the oxygen-enriching step provides an oxidizer with an oxygen ratio greater than 0.21 and equal to or less than 0.35.

Another aspect of the present invention the method further comprises cooling the support surface to a temperature lower than 49° C. (120° F.). In another embodiment of the method, a preheated nip roll is used for contacting the first side of the film, wherein the nip roll is attached to the frame adjacent the backing roll, and wherein the film is between the nip roll and the backing roll.

In yet another embodiment of the above method, the burner is positioned such that the angle measured between the burner and the nip roll is less than 45°, wherein a vertex of the angle is positioned at an axis of the backing roll.

In another embodiment of the method of flame-perforating film, the method comprises the steps of: providing backing roll having a support surface, wherein the support surface includes a plurality of lowered portions; providing a nip roll, wherein the nip roll includes an outer surface, and wherein the outer surface of the nip roll is heated; enriching a combustible mixture with oxygen; igniting the combustible mixture to form a stable flame supported by a burner and fueled by the oxygen-enriched combustible mixture, wherein the burner is positioned such that the angle measured between the burner and the nip roll is less than 45°, wherein the vertex of the angle is positioned at the axis of the backing roll; contacting a film against the support surface; pressing the film between the nip roll and the support surface of the backing roll to pre-heat the film; and thereafter perforating the film with a flame of the burner.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
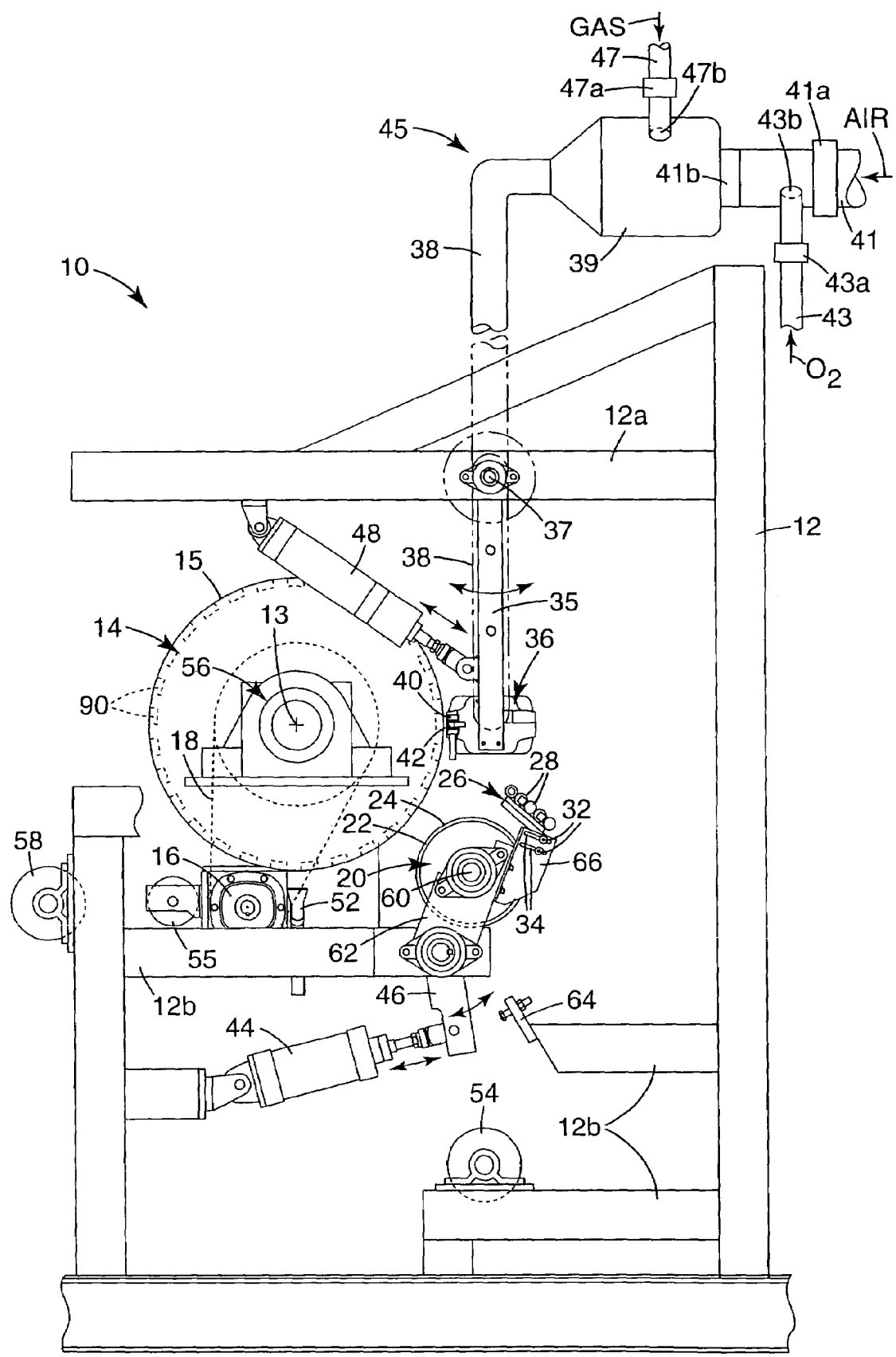
FIG. 1 is a side view of a flame-perforating apparatus of the present invention.

The present invention provides embodiments of an apparatus for flame-perforating films and methods for flame-perforating films that include an oxygen-enrichment system for the combustible mixture. Oxygen-enriched flames used for perforation assist in increasing the web speed of the films being flame perforated while maintaining acceptable film quality. Acceptable film quality includes fully and uniformly open, consistently formed perforations in films without wrinkles or other defects, such as tears, thermal damage, or forming partially formed perforations. These qualities in a perforated elastomeric or polymeric film are very important for particular end uses, such as providing an adhesive tape backing at a low cost with high tensile strength and excellent conformability that has easy, straight, hand-tearability in both the longitudinal and transverse direction, without unwanted elongation of the tape while hand-tearing.

The use of oxygen-enriched flames increases the speed of the perforation process and often improves the physical uniformity of the perforations. The perforation speed obtained using the present invention can be much greater than the speeds where oxygen enrichment is not employed. Additionally, significant improvement in perforation uniformity can also be attained.

Flames may be described in terms of two characteristics: the flame power and the molar ratio of oxidizer to fuel. The flame power is the product of the volume of fuel burned per unit time and the heat content of the fuel. Typical units for the flame power are watts (W) or Btu/hr. The flame power can be normalized to account for the dimensions of the burner, leading to units such as $W/cm^2$ or Btu/hr-in.

The exact ratio of oxidizer to fuel needed for complete combustion is known as the stoichiometric ratio. For example, the exact amount of dry air necessary for the complete combustion of methane is 9.55 volumes of dry air per volume of methane; so the stoichiometric ratio for an air:methane flame is 9.55:1 or alternatively expressed as just 9.55. The equivalence ratio is defined as the stoichiometric oxidizer:fuel ratio divided by the actual oxidizer:fuel ratio. For fuel-lean, or oxidizing, flames, there is more than the stoichiometric amount of oxidizer and so the equivalence ratio is less than 1.00. For oxidizer:fuel mixtures at the stoichiometric ratio, the equivalence ratio is equal to 1.00. For fuel-rich systems, the equivalence ratio is greater than 1.00.

In the context of the present invention, oxygen enrichment involves the addition of oxygen to the combustible mixture used to support the laminar, premixed hydrocarbon flame that is used for perforating. Oxygen enrichment of the combustible mixture causes several changes to the flame, including an increased flame temperature, an increased laminar flame speed, and a decrease in the total flow of combustible mixture passing through the burner. The increase in flame temperature occurs because there is less inert nitrogen to be heated by the combustion reaction. The increase in flame speed causes the luminous flame cones that are stabilized on the ribbon burner to decrease in size for a given flame power. In other words, at a given flow rate of fuel, the height of the luminous flame cone will decrease as the concentration of oxygen in the mixture increases at a constant equivalence ratio. The decrease in the flow of combustible mixture is caused by the decreasing amount of nitrogen in the oxidizer.

Figure 2:
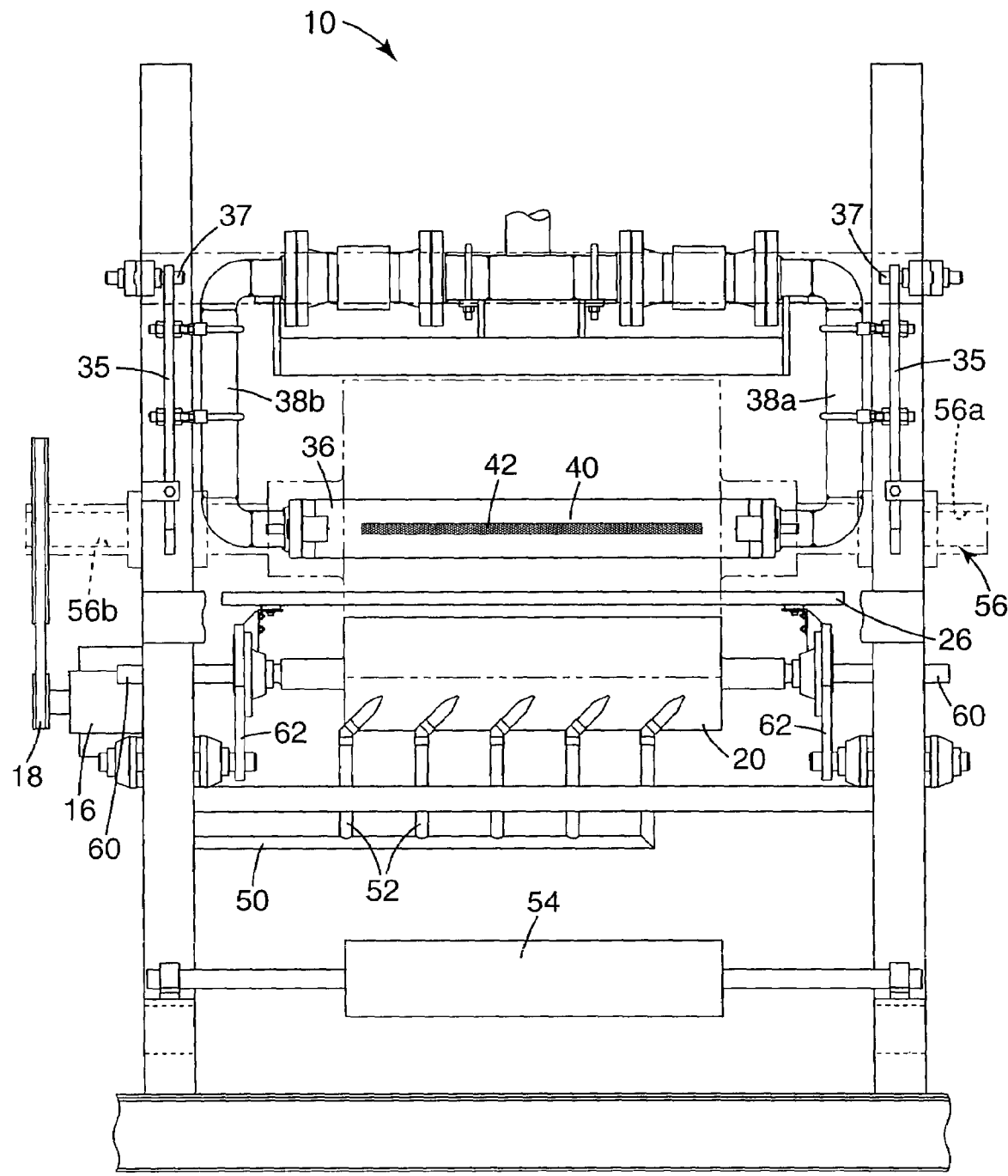
FIG. 2 is a partial front view of the apparatus of FIG. 1 with two of the idler rolls and motor removed for clarity, and the backing roll shown in phantom lines.

FIGS. 1 and 2 are illustrations of one embodiment of an apparatus for making flame-perforated films of the present invention. FIG. 1 illustrates a side view of the apparatus 10 and shows one embodiment of oxygen-enrichment system 45. FIG. 2 illustrates a front view of a portion of apparatus 10, with the backing roll 14 shown in phantom lines, and with the idler rollers 55, 58 and motor 16 removed, for clarity.

The apparatus 10 includes a frame 12. The frame 12 includes an upper portion 12a and a lower portion 12b. The apparatus 10 includes a backing roll 14 having an outer support surface 15. The support surface 15 preferably includes a pattern of lowered portions 90. These lowered portions 90 and the portions of the support surface 15 between the lowered portions collectively make up the support surface 15 of the backing roll 14. The lowered portions 90 form a pattern of indentions in the support surface 15. The lowered portions 90 may be a plurality of depressed or recessed portions or a plurality of indentations along the support surface 15. These lowered portions 90 are preferably etched into the support surface 15. Alternatively, the pattern of lowered portions 90 may be drilled, ablated, or engraved into the support surface 15. The lowered portions 90 preferably are in the shape of ovals, and preferably each have an approximate length of 0.1778 cm (70 mils) or less, an approximate width of 0.0762 mm (30 mils) or less, and an approximate depth of 0.02032 cm (8 mils) or more. One example of a pattern of perforations is taught in WO 02/11978, titled "Cloth-like Polymeric Films," (Jackson et al.), that published on Feb. 14, 2002, which is hereby incorporated by reference for said pattern.

In one embodiment, the support surface 15 of the backing roll 14 is temperature-controlled, relative to the ambient temperature around the apparatus 10. The support surface 15 of the backing roll 14 may be temperature-controlled by any means known in the art. Preferably, the support surface 15 of the backing roll 14 is cooled by providing cooled water into the inlet portion 56a of hollow shaft 56, into the backing roll 14, and out of the outlet portion 56b of the hollow shaft 56. The backing roll 14 rotates about its axis 13. The apparatus 10 includes a motor 16 attached to the lower portion 12b of the frame. The motor drives a belt 18, which in turn rotates the shaft 56 attached to the backing roll 14, thus driving the backing roll 14 about its axis 13.

The apparatus 10 includes a burner 36 and burner piping 38. The apparatus 10 may include an optional exhaust hood (not shown) mounted above the apparatus 10. The burner 36 and burner piping 38 are attached to the upper portion 12a of the frame 12 by burner supports 35. The burner supports 35 may pivot about pivot points 37 by movement of actuator 48 to move the burner 36 relative to the support surface 15 of the backing roll 14. The supports 35 may be pivoted by the actuator 48 to position the burner 36 to a desired distance either adjacent or away from the support surface 15 of backing roll 14. The combustible mixture is fed to the burner 36 via burner pipes 38. Burner pipe 38 splits into burner pipe 38a and burner pipe 38b, which connect to each end of burner 36. Apparatus 10 includes an oxygen-enrichment system 45 connected to opposite end of burner pipe 38, away from burner 36. One component of the oxygen enrichment system 45 is air line 41, which connects to burner pipe 38 via a venturi mixer 39. The flow of air through air line 41 is regulated by air flow controller 41a. Oxygen line 43 is regulated by oxygen flow controller 43a and feeds into air line 41 at oxygen inlet port 43b. The oxygen enriched air flow is carried to venturi mixer 39 via air line 41 to oxidizer inlet port 41b. The fuel component of the combustible mixture is typically a gaseous hydrocarbon fuel and is regulated by fuel flow controller 47a through fuel line 47 into the venturi mixer 39 at fuel inlet port 47b. Appropriate volumes of the gaseous fuel and oxygen-enriched air are regulated into the venturi mixer 39 to create a combustible mixture. In one embodiment the fuel is natural gas.

The oxygen ratio is the ratio of the total flow of molecular oxygen present in the oxidizer to the total flow of all components in the oxidizer. The oxygen ratio in the oxidizer is calculated according to the following expression, when the oxidizer consists of air and oxygen:

$$\text{Oxygen ratio} = (F_{O2} + 0.21 F_{AIR})/(F_{O2} + F_{AIR})$$

where $F_{O2}$ is the flowrate of oxygen (in lpm or cfh) and $F_{AIR}$ is the flowrate of air (in lpm or cfh). It should be noted that the oxygen ratio of air is approximately 0.21. An increase in the potential for damage to the burner due to overheating and for hazardous flashback may occur as the oxygen ratio increases. Thus, most commercially available ribbon burners can only be safely operated at oxygen ratios below 0.35. Theoretically, a new burner design, which might include for example, modified burner port size and burner port distribution, as well as alternative burner ribbon and burner housing materials, could make it possible to operate at higher oxygen ratios.

Figure 3:
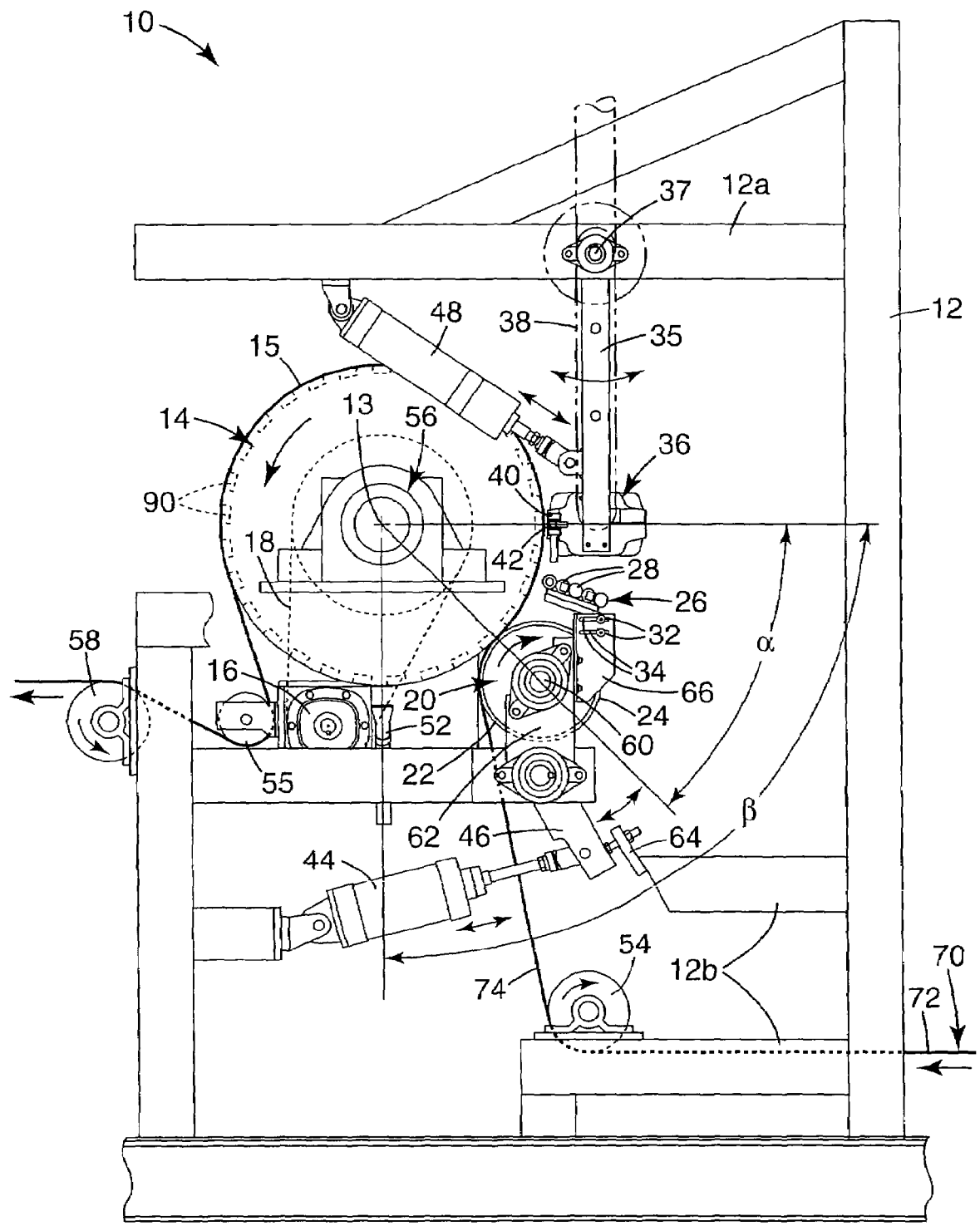
FIG. 3 is a side view of the apparatus of FIG. 1 including film moving along the film path within the apparatus.

In one embodiment of the present invention, the apparatus 10 includes a preheat roll 20 attached to the lower portion 12b of the frame 12. The preheat roll 20 includes an outer roll layer 22. The outer roll layer 22 includes an outer surface 24. The outer roll layer may be made, for example, of an elastomer, for example a high-service-temperature elastomer. The preheat roll 20 may be, for example, a nip roll, which may be positioned against the backing roll 14 to nip the film between the nip roll 20 and backing roll 14. However, it is not necessary that the preheat roll 20 be a nip roll and instead, the preheat roll may be positioned away from the backing roll 14 so as to not contact the backing roll 14. The nip roll 20 freely rotates about its shaft 60 and is mounted to roll supports 62. Linkage 46 is attached to roll supports 62. The nip roll 20 may be positioned against the backing roll 14, using actuator 44. When the actuator 44 is extended (as shown in FIG. 3), the linkage 46 is rotated counterclockwise, and in turn, the roll supports 62 are rotated counterclockwise until the nip roll 20 contacts the backing roll 14. The actuator 44 may control the movement between the nip roll 20 and the backing roll 14, and thus may control the pressure between the nip roll 20 and backing roll 14. A stop 64 is attached to the lower frame 12b to inhibit the movement of the linkage 46 beyond the lower frame 12b, which limits the pressure applied by the nip roll 20 against the backing roll 14.

In another embodiment of the present invention, the apparatus 10 includes a temperature-controlled shield 26 attached to support 62 by brackets 66 to form one assembly. Accordingly, when the actuator 44 rotates the nip roll 20, as explained above, the shield 26 moves with the nip roll. The shield 26 may be positioned relative to the nip roll 20 by bolts 32 and slots 34 attached to the brackets 66. The temperature-controlled shield 26 may include a plurality of water-cooled pipes 28. However, other means of providing a temperature-controlled shield may be used, such as water-cooled plate, air-cooled plate, or other means in the art. The temperature-controlled shield 26 may be positioned between the burner 36 and the nip roll 20. In this position, the shield 26 protects the nip roll 20 from some of the heat generated from the burner 36, and thus, can be used to control the temperature of the outer surface 24 of the nip roll 20, which has the benefits of reducing wrinkles or other defects in the film at the flame-perforation step performed by the burner 36, while maintaining high film speeds.

In yet another embodiment of the present invention, the apparatus 10 includes an optional applicator 50 attached to the lower portion 12b of frame 12. The apparatus 10 includes a plurality of nozzles 52 connected to applicator 50. In one embodiment, the applicator 50 is an air applicator for applying air onto the backing roll 14. In another embodiment, the applicator 50 is a liquid applicator for applying liquid onto the backing roll 14. Preferably, the liquid is water, however other liquids may be used instead. If the liquid is applied by the applicator 50, then preferably, air is also supplied to the individual nozzles to atomize the liquid prior to application on the backing roll. The manner in which the air or water may be applied to the backing roll 14 may be varied by one skilled in the art, depending on the pressure, rate or velocity of the air or water pumped through the nozzles 52. As explained below, without wishing to be bound by any theory, it is believed that if air or water is applied to the support surface 15 of the backing roll 14, prior to contacting the film to the support surface 15, then this application of air or water helps either remove some of the condensation built up on the support surface 15 or applies additional water to actively control the amount of water between the film and the support surface, and thereby helps in eliminating wrinkles or other defects formed in the film at the flame-perforation step conducted by the burner 36.

The apparatus 10 includes a first idler roller 54, a second idler roller 55, and a third idler roller 58 attached to the lower portion 12b of the frame 12. Each idler roller 54, 55, 58 includes their own shafts and the idler rollers may freely rotate about their shafts.

A variety of burners 36 are commercial available, for example, from Flynn Burner Corporation, New Rochelle, N.Y.; Aerogen Company, Ltd., Alton, United Kingdom, and Sherman Treaters Ltd., Thame, United Kingdom. A ribbon burner is typically desired for the flame perforation of polymer films, but other types of burners such as drilled-port or slot design burners may also be used. In one embodiment, the apparatus may include a mixer (e.g. a venturi mixer) to combine the oxidizer and fuel before it feeds the flame used in the flame-perforating process of the invention. In the embodiment represented by FIGS. 1 and 3, the oxygen is first introduced into the air stream, creating an oxygen-enriched oxidizer stream. The oxygen-enriched oxidizer stream is then combined with the fuel stream in a venturi mixer to create an oxygen-enriched combustible mixture.

However, the use of a mixer is not necessary and the arrangement (order) of the air, oxygen and fuel lines may be in almost any configuration, provided the final combustible mixture has an increased amount of oxygen compared to air and provided the appropriate volumes of fuel and oxidizer are combined prior to the burner to support a uniform and stable flame.

FIG. 3 illustrates the path that the film travels through the apparatus 10 and one preferred method of flame-perforating films. The film 70 includes a first side 72 and a second side 74 opposite the first side 72. The film travels into apparatus 10 and around first idle roller 54. From there, the motor-driven backing roll 14 pulls the film. In this position, the film is positioned between the nip roll 20 and the backing roll 14. In this step of the process, the second side 74 of the film 70 is cooled by the water-chilled backing roll 14 and the first side 72 of the film 70 is simultaneously heated by the outer surface 24 of the pre-heat or nip roll 20. This step of preheating the film 70 with the nip roll outer surface 24 of the nip roll 20 prior to flame-perforating the film with the burner 36 unexpectedly provided the benefits of reducing wrinkles or other defects in the perforated film.

The temperature of the outer support surface 15 of the backing roll 14 may be controlled by the temperature of the water flowing through the backing roll 14 through shaft 56. The temperature of the outer support surface 15 may vary depending on its proximity to the burner 36, which generates a large amount of heat from the flames. In addition, the temperature of the support surface 15 will depend on the material of the support surface 15.

The temperature of the outer surface 24 of the outer layer 22 of the nip roll 20 is controlled by a number of factors. First, the flame power and the temperature of the flames affect the temperature of outer surface 24 of the nip roll 20. Second, the distance between the burner 36 and the nip roll 20 affects the temperature of the outer surface 24. For example, positioning the nip roll 20 closer to the burner 36 will increase the temperature of the outer surface 24 of the nip roll 20. Conversely, positioning the nip roll farther away from the burner 36 will decrease the temperature of the outer surface 24 of the nip roll 20. The distance between the axis of nip roll 20 and the center of the burner face 40 of the burner 36, using the axis 13 of the backing roll 14 as the vertex of the angle, is represented by angle $\alpha$. Angle $\alpha$ represents the portion of the circumference of the backing roll or the portion of the arc of the backing roll between the nip roll 20 and the burner 36. It is preferred to make angle $\alpha$ as small as possible, without subjecting the nip roll to such heat from the burner that the material on the outer surface of the nip roll starts to degrade. For example, angle $\alpha$ is preferably less than or equal to 45°. Third, the temperature of the outer surface 24 of the nip roll 20 may also be controlled by adjusting the location of the temperature-controlled shield 26 between the nip roll 20 and the burner 36, using bolts 32 and slots 34 of the brackets 66. Fourth, the nip roll 20 may have cooled water flowing through the nip roll, similar to the backing roll 14 described above. In this embodiment, the temperature of water flowing through the nip roll may affect the surface temperature of the outer surface 24 of the nip roll 20. Fifth, the surface temperature of the support surface 15 of the backing roll 14 may affect the surface temperature of the outer surface 24 of the nip roll 20. Lastly, the ambient temperature of the air surrounding the nip roll 20 may also impact the temperature of the outer surface 24 of the nip roll 20.

The temperature of the support surface 15 of backing roll 14 may be in the range of 7° C. to 54° C. (45° F. to 130° F.), in other embodiments this temperature may be in the range of 10° C. to 41° C. (50° F. to 105° F.). The temperature of the nip roll surface 24 of nip roll 20 may be in the range of 74° C. to 204° C. (165° F. to 400° F.), in other embodiments this temperature may be in the range of 82° C. to 121° C. (180° F. to 250° F.). However, the nip roll surface 24 should not rise above the temperature at which the nip roll surface material may start to melt or degrade. Although the temperature of the support surface 15 of the backing roll 14 and the temperature of the nip roll surface 24 of the nip roll 20 are listed above, one skilled in the art, based on the benefits of the teaching of this application, could select temperatures of the support surface 15 and nip roll surface 24 depending on the film material and the rotational speed of the backing roll 14 to flame-perforate film with reduced numbers of wrinkles or defects.

Returning to the process step, at this location between the preheat roll 20 and backing roll 14, the preheat roll preheats the first side 72 of the film 70 prior to contacting the film with the flame of the burner. Unexpectedly, the temperature of the preheat roll is critical in helping to eliminate wrinkles or other defects in the film at the flame-perforation step.

In the next step of the process, the backing roll 14 continues to rotate moving the film 70 between the burner 36 and the backing roll 14. This particular step is illustrated in FIG. 3. When the film comes in contact with the flames of the burner 36, the portions of the film that are directly supported by the chilled metal support surface are not perforated because the heat of the flame passes through the film material and is immediately conducted away from the film by the cold metal of the backing roll 14, due to the excellent heat conductivity of the metal. However, a pocket of air is trapped behind those portions of the film material that are covering the etched indentations or lowered portions 90 of the chilled support material. The heat conductivity of the air trapped in the indentation is much less than that of the surrounding metal and consequently the heat is not conducted away from the film. The portions of film that lie over the indentations then melt and are perforated. As a result, the perforations formed in the film 70 correlate generally to the shape of the lowered portions 90. At about the same time that film material is melted in the areas of the lowered portions 90, a raised ridge or edge 120 (shown only in FIGS. 4 and 5) is formed around each perforation, which consists of the film material from the interior of the perforation that has contracted upon heating.

After the burner 36 has flame-perforated the film, the backing roll 14 continues to rotate, until the film 70 is eventually pulled away from the support surface 15 of the backing roll 14 by the idler roller 55. From there, the flame-perforated film 70 is pulled around idler roll 58 by another driven roller (not shown). The flame-perforated film may be produced by the apparatus 10 in long, wide webs that can be wound up as rolls for convenient storage and shipment. Alternatively, the film 70 may be combined with a layer of pressure-sensitive adhesive or other films to provide tape, as discussed in reference to FIG. 5.

As mentioned above, the apparatus 10 may include the optional applicator 50 for either applying air or water to the support surface 15 of the backing roll 14, prior to the film 70 contacting the support surface between the backing roll 14 and the nip roll 20. Without wishing to be bound by any theory, it is believed that controlling the amount of water between the film 70 and the support surface 15 helps reduce the amount of wrinkles or other defects in the flame-perforated film. There are two ways in which to control the amount of water between the film 70 and the support surface 15. First, if the applicator 50 blows air onto the support surface, then this action helps reduce the amount of water build up between the film 70 and support surface 15. The water build up is a result of the condensation that is formed on the backing roll surface when the water-cooled support surface 15 is in contact with the surrounding environment. Second, the applicator 50 may apply water or some other liquid to the support surface 15 to increase the amount of liquid between the film 70 and the support surface. Either way, it is believed that some amount of liquid between the film 70 and the support surface 15 may help increase the traction between the film 70 and the support surface 15, which in turn helps reduce the amount of wrinkles or other defects in the flame-perforated film. The position of the nozzles 52 of the applicator 50 relative to the centerline of the burner 36 is represented by angle β, where the vertex of the angle is at the axis 13 of the backing roll 14. In one embodiment, the applicator 50 is at an angle β greater than angle α, so that the air or water is applied to the backing roll 14 prior to the nip roll 20.

The burner supports 35 and the actuator 48, as explained above in reference to FIG. 1, may adjust the relative distance between the burner 36 and backing roll 14. The flame is a luminous cone supported by the burner, the height of which can be measured with means known in the art, from burner housing face to the tip of the flame. Actually, the ribbon burner 36 has a plurality of flames and preferably, all flame tips are at the same position relative to the burner housing, preferably uniform in length. However, the flame tips could vary, for example, depending on non-uniform ribbon configurations or non-uniform gas flow into the ribbons. For simplicity, the plurality of flames is referred to as one flame. The distance between the face 40 of the burner 36 and the first side 72 of the film 70 is referred to as the burner-to-film separation distance.

Preferably, the film 70 a polymeric substrate. The polymeric substrate may be of any shape that permits perforation by flame and include, for example, films, sheets, porous materials and foams. Such polymeric substrates include, for example, polyolefins, such as polyethylene, polypropylene, polybutylene, polymethylpentene; mixtures of polyolefin polymers and copolymers of olefins; polyolefin copolymers containing olefin segments such as poly(ethylene vinylacetate), poly(ethylene methacrylate) and poly(ethylene acrylic acid); polyesters, such as poly(ethylene terephthalate), poly(butylene phthalate) and poly(ethylene naphthalate); polystyrenes; vinylics such as poly(vinyl chloride), poly(vinylidene dichloride), poly(vinyl alcohol) and poly(vinyl butyral); ether oxide polymers such as poly(ethylene oxide) and poly(methylene oxide); ketone polymers such as polyetheretherketone; polyimides; mixtures thereof, or copolymers thereof. Preferably, the film is made of oriented polymers and more preferably, the film is made of biaxially oriented polymers. Biaxially oriented polypropylene (BOPP) is commercially available from several suppliers including: ExxonMobil Chemical Company of Houston, Tex.; Continental Polymers of Swindon, UK; Kaisers International Corporation of Taipei City, Taiwan and PT Indopoly Swakarsa Industry (ISI) of Jakarta, Indonesia. Other examples of suitable film material are taught in WO 02/11978, titled "Cloth-like Polymeric Films," (Jackson et al.).

Figure 4:
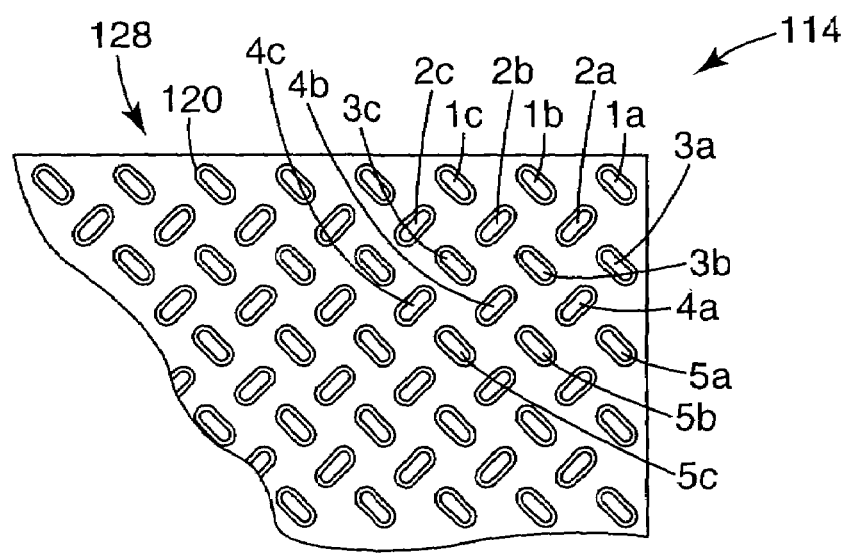
FIG. 4 is a top plan view of a pattern of perforations in film, after the film has been perforated with the flame-perforating apparatus of FIG. 1.
Figure 5:
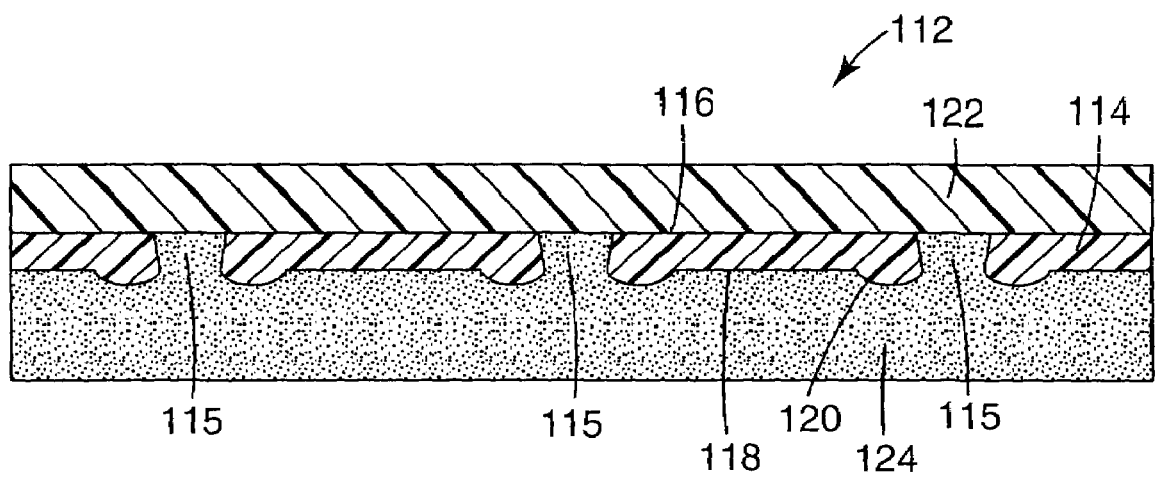
FIG. 5 is a cross-sectional view of a tape including the film of FIG. 4.

FIG. 4 illustrates a top view of a pattern of perforations in film after it has been perforated with the flame-perforating apparatus of FIG. 1. The perforations are typically elongate ovals, rectangles, or other non-circular or circular shapes arranged in a fashion such that the major axis of each perforation intersects adjacent perforations or passes near adjacent perforations. As shown in FIG. 5, this perforated polymeric film 114 can be joined to one or more additional layers or films, such as a top layer to provide durability or impermeability, or a bottom layer to provide adhesiveness.

The perforation pattern formed in polymeric film 114 has a strong influence on the tear and tensile properties of the perforated films and tape backings of the invention. In FIG. 4, a portion of an enlarged layout of a typical perforation pattern 128 is shown, with the machine direction oriented up and down, and the transverse direction oriented left to right. Depicted perforation pattern 128 comprises a series of rows of perforations, identified as a first row having perforations 1a, 1b, and 1c; a second row having perforations 2a, 2b, and 2c; a third row having perforations 3a, 3b, and 3c; a fourth row having perforations 4a, 4b, and 4c; and a fifth row having perorations 5a, 5b, and 5c. The perforation pattern 128 includes other rows of perforations, similar to the first row through the fifth row. Each perforation includes a raised ridge or edge 120. In specific implementations, this raised ridge 120 has been observed to provide enhanced tear properties of the perforated film 114. The raised ridge 120 can also impart slight textures that cause the film 114 to more closely resemble a cloth-like material. Typically the perforations form a pattern extending along most or all of the surface of a film, and thus the pattern shown in FIG. 4 is just a portion of one such pattern.

As explained above in reference to FIG. 4, the perforation pattern 128 formed in film 114 correlates generally to the pattern of lowered portions 90 formed into the support surface 15 of backing roll 14. The film shown in FIG. 4 includes numerous perforations, each of which are generally oval-shaped, preferably includes a length of approximately three-times greater than the width. However, one skilled in the art could select any pattern of lowered portions 90 in support surface 15 of the backing roll 14 to create alternative perforation patterns or sizes.

The films described herein are suited for many adhesive tape backing applications. The presence of a top film over the perforation pattern can provide an appearance similar to a poly-coated cloth-based tape backing in certain embodiments. This appearance, combined with the tensile and tear properties, makes the film useful as a backing for duct tape, gaffer's tape, or the like. Particularly for duct tape, incorporation of known appropriate pigments for a silver-gray coloration into the top film contributes to a familiar appearance, which is desired in the marketplace. Because the backing is conformable, it is also useful as a masking tape backing.

FIG. 5 illustrates a cross-sectional view of one embodiment of a tape 112 including the film of FIG. 4 as a tape backing. Tape 112 contains a perforated film 114 having first major surface 116 and second major surface 118. Perforated film 114 contains perforations 115 extending through its thickness. In the embodiment illustrated, the edges of each perforation 115 along second major surface 118 include raised portions 120. Perforated film 114 is typically an oriented film, e.g. a biaxially oriented film.

Polymeric tape 112 further includes a top film 122 and a bottom layer 124. In the embodiment illustrated, top film 122 provides durability to the polymeric tape 112, and can further increase the strength and impart fluid impermeability to tape 112. Bottom layer 124 is, for example, an adhesive composition. Additional or alternative layers can be used to create tape 112. The arrangement of the layers can also be changed. Thus, for example, the adhesive can be applied directly to the top film 122 rather than to the perforated layer.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

A custom-designed flame perforation system described in U.S. patent application Ser. No. 10/267,538 was modified by adding an oxygen-enrichment system. Flow-control hardware was used to enable the injection of oxygen into the air stream, forming an oxidizer stream immediately prior to the venturi mixer where the oxidizer stream and natural gas fuel were combined to form a combustible mixture. The flow of ultra-high-purity oxygen (>99.99%), available from Oxygen Service Co. of St. Paul Minn., at a gage pressure of 276 kPa (40 psi) was measured using a Millipore Tylan FC-2921V-J mass flow controller. The oxygen ratio in the oxidizer stream was calculated as described above.

Examples of perforated films of biaxially oriented polypropylene (BOPP) were produced under the following operating conditions. Dust-filtered, 25° C. compressed air was injected with oxygen as stated above and then mixed with a natural gas fuel (having a specific gravity of 0.577, a stoichiometric ratio of dry air to natural gas of 9.6:1, and a heat content of 37.7 kJ/L) in a venturi mixer, available from Flynn Burner Corporation, of New Rochelle, N.Y., to form a combustible mixture. The flow rates of natural gas and air were controlled with control valves available from Foxboro-Eckardt GmbH of Stuttgart, Germany, and were measured with mass flow meters available from Flow Technology Inc. of Phoenix, Ariz. All flows were adjusted to result in a flame equivalence ratio of 0.96 and a normalized flame power of 1600 W/cm$^2$ (15,000 Btu/hr-in.). The combustible mixture passed through a 3 meter long pipe to a ribbon burner, which consisted of a 33 cm×1 cm, 6-port corrugated stainless steel ribbon mounted in a brass housing, Series 850, supplied by Flynn Burner Corporation, New Rochelle, N.Y.

The burner was mounted adjacent a 35.5 cm diameter, 46 cm face-width, steel, double-shelled, spirally-wound, chilled backing roll, available from F. R. Gross Company, Inc., Stow Ohio. The temperature of the backing roll was controlled by a 227 l/min (60 gal/min) recirculating flow of water at a temperature of 7.2° C. (45° F.). The steel backing roll shell was plated with 0.5 mm of copper of a 220 Vickers hardness, then engraved by Custom Etch Rolls Inc. of New Castle, Pa., with a perforation pattern shown in FIG. 6 of U.S. patent application Ser. No. 10/267,538. Filtered, compressed air at a pressure of 69 kPa/m$^2$ (10 psi) was directed onto the chilled backing roll to controllably reduce the amount of water condensation accumulating on the patterned portion of the backing roll.

An electric spark ignited the combustible mixture. Stable conical flames were formed with tips at a distance of approximately 9–20 mm from the face of the burner housing. For oxygen ratios of 0.21, 0.23, 0.25 and 0.27, the size of the flame cones were approximately 20 mm, 16 mm, 12 mm, and 9 mm, respectively. The distance between the ribbons 42 and the face 40 of the burner 36 was equal to 3 mm. A thermally extruded, biaxially oriented polypropylene (BOPP) homopolymer film, which was 0.03 mm (1.2 mil) thick and 30 cm wide, was guided by idler rolls to wrap around the chilled backing roll and processed through the system at an adjustable speed. The film web was maintained at an upstream and downstream tension of approximately 1.5 N/lineal cm (0.8 lbs/lineal inch).

To ensure intimate contact between the BOPP film and the chilled backing roll, a 10 cm diameter, 40 cm face-width, inbound nip roll, available from American Roller Company, Kansasville, Wis., covered with 6 mm of VN 110 (80 Shore A durometer) VITON fluoroelastomer, was located at a position of approximately 45 degrees relative to the burner, on the inbound side of the chilled backing roll. Positioned between the nip roll and the burner, a water-cooled shield was maintained at a temperature of 50° F. (10° C.) with recirculating water. The nip roll-to-backing roll contact pressure was maintained at approximately 50 N/lineal cm.

Table 1 shows the results of an experiment where the burner-to-film distance (the distance between the surface of the burner face 40 housing and the first side 72 of the film 70) was varied between 5 to 14 mm while the oxygen ratio in the oxydizer stream was maintained at either 0.21, 0.23, 0.25 or 0.27, where the oxygen ratio of 0.21 is essentially air with no oxygen enrichment. For example, a maximum web speed of 95 m/min was achieved while maintaining acceptable hole size under the process conditions of burner-to-film separation of 5 mm and 0.27 oxygen ratio. Given that the size of the flame cone was approximately 9 mm beyond the burner, the flame impinged the film by approximately 4 mm.

Using an Olympus SZH-1LLD optical microscope with a 100× eyepiece, the dimensions of the perforations (holes) generated in the BOPP films were measured. As shown in FIG. 6 of U.S. patent application Ser. No. 10/267,538, the perforated holes were in the shape of an ellipse or oval having both a major and a minor axis. Both axes were measured on at least 50 randomly chosen holes or, alternately, on sufficient numbers of randomly chosen holes to generate a normal distribution of measurement data if 50 measurements had not already defined a normal distribution. The maximum number of holes that needed to be measured to generate the normal distribution was 75. A normal distribution of hole-dimension measurements was desirable so that the data could be better analyzed statistically to quantify the perforation quality.

For each combination of process conditions (burner-to-film separation and oxygen ratio), the maximum film speed was determined that still enabled 100% open perforations across the entire width of the 30-cm BOPP film. Perforations at each process condition were required to have approximately the same average major axis dimension of 0.813 mm (32.0 mil). By maintaining the same size perforation at all of the process conditions investigated, more consistent speed and quality comparisons were made.

Thus, to evaluate the effect of an oxygen-enriched flame on perforation quality, the maximum speed in meters/min that continued to provide 100% open perforations across the entire width of the film was determined for each oxygen ratio level and burner-to-film separation distance. In other words, through the statistical measurement means described above, the perforation hole size was held constant, while the process conditions of oxygen ratio and burner-to-film separation were varied to determine the maximum process speed. In most cases the perforation uniformity has also been improved as compared with a flame perforation process using no oxygen-enrichment.

TABLE 1

| Burner-to-film Separation (mm) | Maximum Perforation Speed (m/min) | | | |
|---|---|---|---|---|
| | 0.21 $O_2$ nominal air | 0.23 $O_2$ oxygen-enriched | 0.25 $O_2$ oxygen-enriched | 0.27 $O_2$ oxygen-enriched |
| 5 | 53 | 83 | 93 | 95 |
| 6 | 50 | 75 | 80 | 85 |
| 7 | 52 | 63 | 72 | 80 |
| 8 | 50 | 55 | 61 | 68 |
| 9 | 50 | 57 | 60 | 65 |
| 10 | 45 | 53 | 53 | 60 |
| 11 | 45 | 50 | 55 | 65 |
| 12 | 40 | 42 | 47 | 56 |
| 13 | 38 | 41 | 44 | 49 |
| 14 | 36 | 39 | 41 | 48 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An apparatus for flame-perforating film, comprising:
   a frame;
   a support surface attached to the frame, wherein the support surface includes a plurality of lowered portions;
   a liquid applicator attached to the frame for applying liquid onto the support surface;
   a burner attached to the frame opposite the support surface, wherein the burner supports a flame;
   a burner pipe connected to the burner; and
   an oxygen-enrichment system connected to the burner pipe.

2. The apparatus of claim 1, comprising a film contacting the support surface, wherein the flame of the burner is directed towards the film.

3. The apparatus of claim 2, further comprising a backing roll attached to the frame, wherein the backing roll includes the support surface, and wherein the film is wrapped around at least a portion of the support surface of the backing roll.

4. The apparatus of claim 2, further including a preheat roll attached to the frame adjacent the support surface, wherein the preheat roll includes an outer surface, and wherein the outer surface of the preheat roll is heated for pre-heating the film prior to the burner.

5. The apparatus of claim 4, wherein the outer surface of the preheat roll is heated greater than 74° C. (165° F.) for pre-heating the film prior to the burner.

6. The apparatus of claim 4, wherein the preheat roll is a nip roll attached to the frame adjacent the backing roll, wherein the film is between the nip roll and the backing roll.

7. The apparatus of claim 6, wherein the burner is positioned such that the angle measured between the burner and the nip roll is less than 45°, wherein a vertex of to angle is positioned at an axis of the backing roll.

8. The apparatus of claim 1, further comprising a mixer, connected to the burner pipe, wherein the mixer facilitates the mixing of appropriate volumes of oxygen, air and a gaseous hydrocarbon fuel to form the oxygen-enriched combustible mixture.

9. The apparatus of claim 1, further including an air applicator attached to the frame adjacent the support surface for blowing air onto the support surface.

* * * * *

UNITED STATES PATENT AND TRADEMARK OFFICE
CERTIFICATE OF CORRECTION

PATENT NO. : 7,160,095 B2
APPLICATION NO. : 10/679633
DATED : January 9, 2007
INVENTOR(S) : Joel A. Getschel It is certified that error appears in the above-identified patent and that said Letters Patent is hereby corrected as shown below:

<u>Column 12,</u>
Line 56, delete "maximum speed" and insert in place thereof -- maximum film speed --.

<u>Column 14</u>
Line 23, delete "of to" and insert in place thereof -- of the --.

Signed and Sealed this

Twenty-fourth Day of April, 2007

JON W. DUDAS
*Director of the United States Patent and Trademark Office*